United States Patent
Lee et al.

(10) Patent No.: US 8,542,614 B2
(45) Date of Patent: Sep. 24, 2013

(54) FULL-DUPLEX WIRELESS VOICE BROADCASTING APPARATUS WITH CHANNEL-CHANGING AND INTERFERENCE-RESISTANCE

(75) Inventors: Ming-Town Lee, Taoyuan County (TW); Jen-Chi Liao, New Taipei (TW); Tung-Jung Hsu, Taoyuan County (TW); Tain-Wen Suen, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 171 days.

(21) Appl. No.: 13/220,847

(22) Filed: Aug. 30, 2011

(65) Prior Publication Data
US 2013/0051283 A1 Feb. 28, 2013

(51) Int. Cl.
*H04B 7/00* (2006.01)
(52) U.S. Cl.
USPC ........... 370/277; 370/278; 370/311; 370/314; 370/443; 370/437
(58) Field of Classification Search
USPC .................. 370/311, 314, 443, 437, 277, 278, 370/282; 455/73
See application file for complete search history.

(56) References Cited

U.S. PATENT DOCUMENTS

| | | | |
|---|---|---|---|
| 7,493,115 B2* | 2/2009 | Mastio | 455/423 |
| 7,949,309 B2* | 5/2011 | Rofougaran et al. | 455/77 |
| 8,265,563 B2* | 9/2012 | Beninghaus et al. | 455/63.1 |
| 2005/0032515 A1* | 2/2005 | Mastio | 455/423 |
| 2005/0119025 A1* | 6/2005 | Mohindra et al. | 455/552.1 |
| 2005/0180399 A1* | 8/2005 | Park et al. | 370/352 |
| 2006/0270465 A1* | 11/2006 | Lee et al. | 455/569.1 |
| 2007/0238483 A1* | 10/2007 | Boireau et al. | 455/553.1 |
| 2008/0299935 A1* | 12/2008 | Safarian et al. | 455/319 |
| 2009/0168939 A1* | 7/2009 | Constantinidis et al. | 375/359 |
| 2009/0203319 A1* | 8/2009 | Sandoval et al. | 455/41.3 |
| 2009/0245673 A1* | 10/2009 | Mody et al. | 382/250 |
| 2010/0157901 A1* | 6/2010 | Sanderovitz et al. | 370/328 |
| 2010/0232474 A1* | 9/2010 | Rofougaran et al. | 375/135 |
| 2011/0028089 A1* | 2/2011 | Komori | 455/39 |
| 2011/0034133 A1* | 2/2011 | Rofougaran et al. | 455/77 |
| 2011/0037863 A1* | 2/2011 | Mihota et al. | 348/208.99 |
| 2011/0076944 A1* | 3/2011 | Mihota | 455/41.2 |
| 2011/0135308 A1* | 6/2011 | Tarlazzi et al. | 398/79 |
| 2011/0136433 A1* | 6/2011 | Tsai et al. | 455/41.2 |
| 2011/0160802 A1* | 6/2011 | Rofougaran et al. | 607/60 |
| 2011/0206088 A1* | 8/2011 | Binder et al. | 375/136 |

FOREIGN PATENT DOCUMENTS

| | | |
|---|---|---|
| TW | 200416022 | 9/2004 |
| TW | 95126014 | 2/2008 |

* cited by examiner

*Primary Examiner* — Ian N Moore
*Assistant Examiner* — Phong La
(74) *Attorney, Agent, or Firm* — Jackson IPG PLLC (57) ABSTRACT

The present disclosure is a full-duplex wireless voice broadcasting apparatus. The apparatus is capable of channel-changing. Full-duplex (two-way) voice communication is achieved by using at least one receiving device and an emitting device. The receiving device has good mobility to be used as an emergent caller to the emitting device. The present disclosure has advantages in interference resistance, energy saving, short-distance emergent calling, and calling for help.

11 Claims, 10 Drawing Sheets

| P.nbr. | Time(us) | Length | Frame control field | | | | | Sequence number | Source PAId | Source Address | Superframe specification | | | | | |
|---|---|---|---|---|---|---|---|---|---|---|---|---|---|---|---|---|
| | | | Type | Sec | Pnd | Ack.req | PAN_compr | | | | B0 | SO | F.CAP | BLE | Coord | Assoc |
| RX 54 | +5905 =257599 | 11 | BCN | 0 | 0 | 0 | 0 | 0x00 | 0x0201 | 0x0000 | 00 | 08 | 00 | 0 | 0 | 0 |
| RX 55 | +4800 =262399 | 11 | BCN | 0 | 0 | 0 | 0 | 0x00 | 0x0201 | 0x0000 | 00 | 08 | 00 | 0 | 0 | 0 |
| RX 56 | +4800 =267199 | 11 | BCN | 0 | 0 | 0 | 0 | 0x00 | 0x0201 | 0x0000 | 00 | 08 | 00 | 0 | 0 | 0 |
| RX 57 | +5120 =272319 | 51 | BCN | 0 | 0 | 0 | 0 | 0x00 | 0x0201 | 0x0000 | 00 | 12 | 00 | 0 | 0 | 0 |
| RX 58 | +4800 =277119 | 51 | BCN | 0 | 0 | 0 | 0 | 0x00 | 0x0201 | 0x0000 | 00 | 12 | 00 | 0 | 0 | 0 |
| RX 59 | +4800 =281919 | 51 | BCN | 0 | 0 | 0 | 0 | 0x00 | 0x0201 | 0x0000 | 00 | 12 | 00 | 0 | 0 | 0 |
| RX 60 | +4800 =286719 | 51 | BCN | 0 | 0 | 0 | 0 | 0x00 | 0x0201 | 0x0000 | 00 | 12 | 00 | 0 | 0 | 0 |

FULL-DUPLEX WIRELESS VOICE BROADCASTING APPARATUS WITH CHANNEL-CHANGING AND INTERFERENCE-RESISTANCE

TECHNICAL FIELD OF DISCLOSURE

The present disclosure relates to a wireless voice apparatus; more particularly, relates to achieving full-duplex (two-way) voice communication by using at least one receiving device with good mobility to be used as an emergent caller to an emitting device and relates to having advantages in interference resistance, energy saving, short-distance emergent calling, and calling for help.

DESCRIPTION OF THE RELATED ARTS

In the market, most microphones, amplifiers and speakers are one-way devices and require wires. Even the wireless microphones (or speakers) may be interfered by noise. Microphones used may be replaced quite often. Places for positioning the microphones may be ever changing. These may cause inconveniences. Not to mention the batteries of the microphones may need to be replaced once in a while. This may also increase financial burden. Hence, the prior arts do not fulfill all users' requests on actual use.

SUMMARY OF THE DISCLOSURE

The main purpose of the present disclosure is to achieve full-duplex (two-way) voice communication by using at least one receiving device with good mobility to be used as an emergent caller to an emitting device; and is to have advantages in interference resistance, energy saving, short-distance emergent calling, and calling for help.

To achieve the above purpose, the present disclosure is a full-duplex wireless voice broadcasting apparatus with channel-changing and interference-resistance, comprising an emitting device and at least one receiving device, where the emitting device comprises a first voice sampling/reconstructing unit; a first local network unit connected with the first voice sampling/reconstructing unit; and an first operation unit connected with the first local network unit; the emitting device periodically emitted data packages and the data packages contain data selected from a group consisting of voice data and non-voice data; the receiving device comprises a second voice sampling/reconstructing unit; a second local network unit connected with the second voice sampling/reconstructing unit; and a second operation unit connected with the second local network unit; after being connected with the emitting device, the receiving device receives the data packages and a standby status is maintained between the emitting device and the receiving device; the emitting device has a method comprising steps of (a) booting and resetting the emitting device; (b) staying in an idle status; (c) checking whether an uploaded package is received; (d) if the uploaded package is not received, processing steps of (d1) reading data in the first flash memory; (d2) setting a quality feedback code; (d3) packaging data; and (d4) transferring a downloaded package and then going to step (b); (e) if the uploaded package is received, unpacking the uploaded package; (f) through a voice data receiving buffer, processing voice reconstruction; (g) checking whether a connection exists; (h) if the connection exists, checking whether an alarm parameter exists; (i) if the connection does not exist, setting a wireless channel parameter and then checking whether the alarm parameter exists; (j) if the alarm parameter exists, starting a light and a voice alarm and checking whether a registration parameter and a check-in parameter exist; (k) if the alarm parameter does not exist, directly checking whether the registration parameter and the check-in parameter exist; (l) if the registration parameter and the check-in parameter do not exist, reading parameters of the emitting device and then going to step (d1); (m) if the registration parameter and the check-in parameter exist, setting the registration parameter; (n) writing buffer data into the first flash memory; (o) reading parameters of the emitting device and then going to step (d1); and (p) on voice-sampling, processing steps of (p1) directly taking a voice sample; (p2) transferring the voice sample to a data register; (p3) checking whether a transferring buffer is full; (p4) if the transferring buffer is full, reading the parameters of the emitting device and then going to step (d1); and (p5) if the transferring buffer is not full, going to step (p1); and the receiving device has a method comprising steps of (a) booting and resetting the receiving device; (b) checking whether a registration is required; (c) if the registration is not required, processing steps of (c1) pushing a registration key; and (c2) checking whether the registration key is pushed more than one second; (d) if the registration key is not pushed more than one second, pushing the registration key more than one second again; (e) if the registration key is pushed more than one second, checking whether a downloaded package is received; (f) if the downloaded package is received, processing steps of (f1) transferring a registration package; and (f2) checking whether the registration is successful; (g) if the registration is not successful, going to step (c1); (h) if the registration is successful, processing steps of (h1) staying in an idle status; and (h2) checking whether an alarm is required; (i) if the alarm is required, starting the alarm and checking whether a transferring buffer is full; (j) if the alarm is not required, directly checking whether the transferring buffer is full; (k) if the transferring buffer is full, processing steps of (k1) reading parameters of the receiving device; (k2) packaging data; and (k3) transferring an uploaded package; (l) if the transferring buffer is not full, checking whether a downloaded package is received; (m) if the downloaded package is not received, going to step (h1); (n) if the downloaded package is received, checking whether a frequency channel needs to be changed; (o) if the frequency channel needs to be changed, processing steps of (o1) changing the frequency channel to a new frequency channel; (o2) processing voice reconstruction through a voice data receiving buffer; and (o3) staying in an idle status; (p) if the frequency channel does not need to be changed, processing step (o2) and step (o3); (q) if the downloaded package is not received in step (e), checking whether a channel table needs to be replaced; (r) if the channel table does not need to be replaced, changing frequency channel and then going to step (e); (s) if the channel table needs to be replaced, going to step (c1); (t) if a registration is required in step (b), checking whether a downloaded package is received; (u) if the downloaded package is received, unpacking package and processing step (m2) and step (m3); (v) if the downloaded package is not received, processing steps of (v1) pushing a function key for check-in; and (v2) checking whether a button is pushed; (w) if a button is not pushed, pushing a button again; (x) if a button is pushed, uploading a check-in package; (y) checking whether a downloaded package is received; (z) if the downloaded package is received, unpacking package and processing step (o2) and step (o3); (aa) if the downloaded package is not received, going to step (c1); and (ab) on voice-sampling, processing steps of (ab1) taking a voice sample; and (ab2) transferring data of the voice sample to a data register and processing step (i2) and step (i3).

Accordingly, a novel full-duplex wireless voice broadcasting apparatus with channel-changing and interference-resistance is obtained.

BRIEF DESCRIPTIONS OF THE DRAWINGS

The present disclosure will be better understood from the following detailed description of the preferred embodiment according to the present disclosure, taken in conjunction with the accompanying drawings, in which.

DESCRIPTION OF THE PREFERRED EMBODIMENT(S)

The following description of the preferred embodiment is provided to understand the features and the structures of the present disclosure.

Please refer to FIG. 1 to FIG. 10, which are a perspective view showing a preferred embodiment according to the present disclosure; a view showing a structure of the present disclosure; a block view showing the present disclosure; a view showing an operation unit; a view showing an emitting device; a view showing a receiving device; a view showing a time sequence; a view showing a voice package; a view showing a channel-changing; and a view showing transferring of voice signals. As shown in the figures, the present disclosure is a full-duplex wireless voice broadcasting apparatus with channel-changing and interference-resistance, comprising an emitting device 1 and at least one receiving device 2.

The emitting device 1 comprises a first voice sampling/reconstructing unit 11; a first local network unit 12, connected with the first voice sampling/reconstructing unit 11; and an first operation unit 13 connected with the first local network unit 12, where the emitting device 1 periodically emits data packages containing voice data or non-voice data. Therein, the first voice sampling/reconstructing unit 11 and the first local network unit 12 are mutually connected through a serial peripheral interface (SPI); the first local network unit 12 comprises a first ZigBee module 121; a power amplifier 122 connected with the first ZigBee module 121; and a first radio frequency (RF) antenna 123 connected with the power amplifier 122; the first ZigBee module 121 comprises a first SPI buffer 1211, a transferring buffer 1212, a transferring package voice unit 1213 and a first flash memory 1214; the first SPI buffer 1211, the transferring buffer 1212 and the transferring package voice unit 1213 are used as buffer and package mechanisms for voice data; and, the first operation unit 13 comprises a first indicating light 131, a talk/mute button 132, a first voice indicator 133, a first power supply unit 134, a first microphone connecting port 135 and a first earphone connecting port 136.

The receiving device 2 comprises a second voice sampling/reconstructing unit 21; a second local network unit connected with the second voice sampling/reconstructing unit 21; and a second operation unit 23 connected with the second local network unit 22. Therein, the second voice sampling/reconstructing unit 21 and the second local network unit 22 are mutually connected through an SPI; the second local network unit 22 comprises a second ZigBee module 221; and a second RF antenna 222 connected with the ZigBee module 221; the second ZigBee module 221 comprises a second SPI buffer 2211, a receiving buffer 2212, a receiving package voice unit 2213 and a second flash memory 2214; the second SPI buffer 2211, the receiving buffer 2212 and the receiving package voice unit 2213 are used as buffer and package mechanisms for voice data; and, the second operation unit 23 comprises a second indicating light 231, a function key 232, a second voice indicator 233, a second power supply unit 234, a second microphone connecting port 235, a second earphone connecting port 236 and a registration key 237. The receiving device 2 uses the second ZigBee module 221 and the second RF antenna 222 of the second local network unit 22 to be coordinated with the first ZigBee module 121 and the first RF antenna 122 of the first network unit 12 of the emitting device 1 for building a connection. After building the connection, the receiving device 2 receives the data packages containing voice or non-voice data; and, a standby status is maintained between the emitting device 1 and the receiving device 2.

Figure 5:
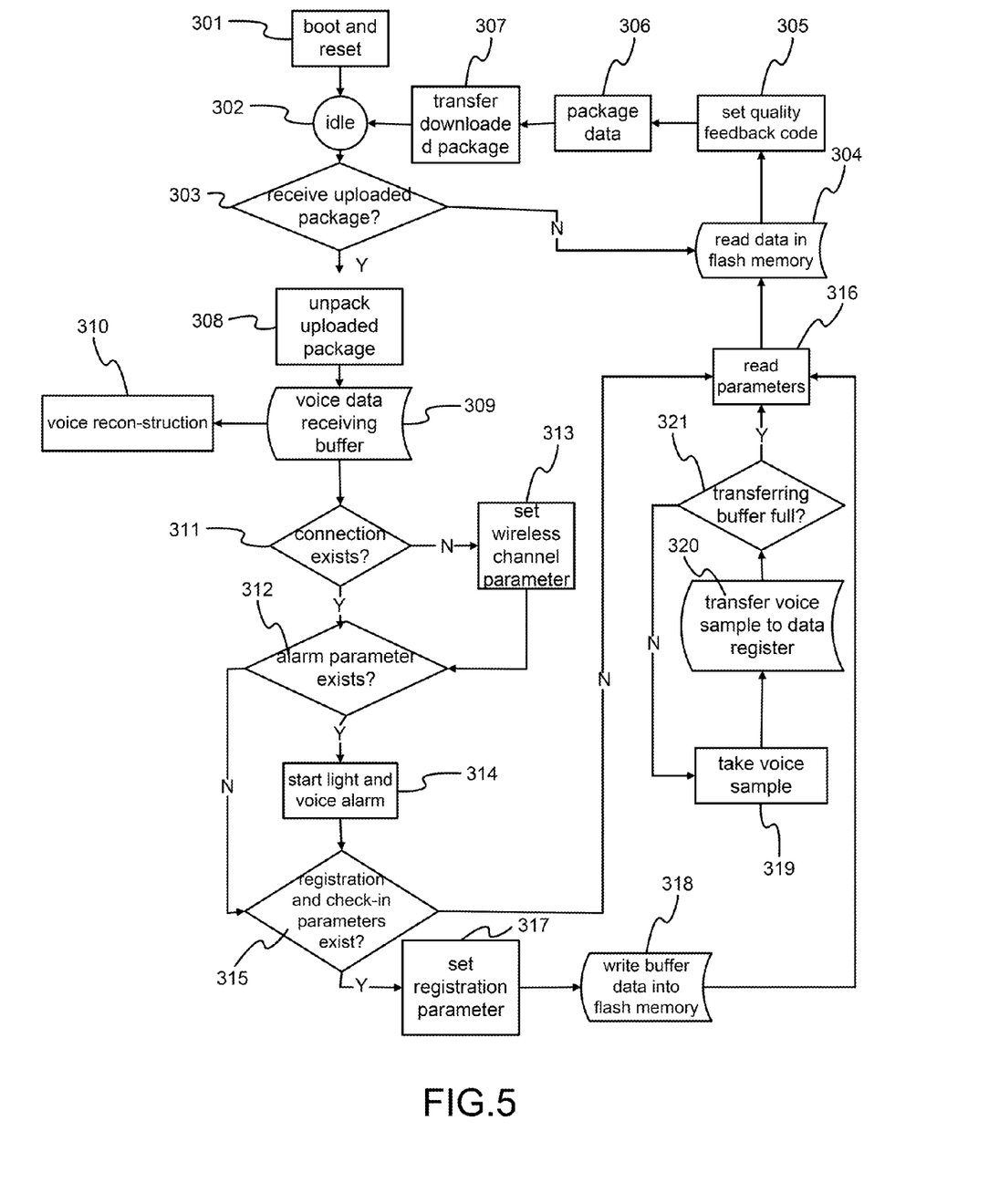
FIG. 5 is the view showing the emitting device.

The emitting device 1 has a method comprising the following steps:

(a) The emitting device is booted and reset 301.

(b) The emitting device is stayed in an idle status 302.

(c) It is checked whether an uploaded package is received 303.

(d) If the uploaded package is not received, the following steps are processed:

(d1) Data in the first flash memory is read 304;

(d2) A quality feedback code is set 305;

(d3) Data is packaged 306.

(d4) A downloaded package is transferred 307 and then go to step (b).

(e) If the uploaded package is received, the uploaded package is unpacked 308.

(f) Through a voice data receiving buffer 309, voice reconstruction is processed 310.

(g) It is checked whether a connection exists 311.

(h) If the connection exists, it is checked whether an alarm parameter exists 312.

(i) If the connection does not exist, a wireless channel parameter is set 313 and then it is checked whether the alarm parameter exists 312.

(j) If the alarm parameter exists, a light and a voice alarm are started 314 and it is checked whether a registration parameter and a check-in parameter exist 315.

(k) If the alarm parameter does not exist, it is checked directly whether the registration parameter and the check-in parameter exist 315.

(l) If the registration parameter and the check-in parameter do not exist, parameters of the emitting device are read 316 and then go to step (d1).

(m) If the registration parameter and the check-in parameter exist, the registration parameter is set 317.

(n) Buffer data is written into the first flash memory 318.

(o) Parameters of the emitting device are read 316 and then go to step (d1).

(p) On voice-sampling, the following steps are processed:

(p1) A voice sample is directly taken 319.

(p2) The voice sample is transferred to a data register 320.

(p3) It is checked whether a transferring buffer is full 321.

(p4) If the transferring buffer is full, the parameters of the emitting device are read 316 and then go to step (d1).

(p5) If the transferring buffer is not full, go to step (p1).

Figure 6:
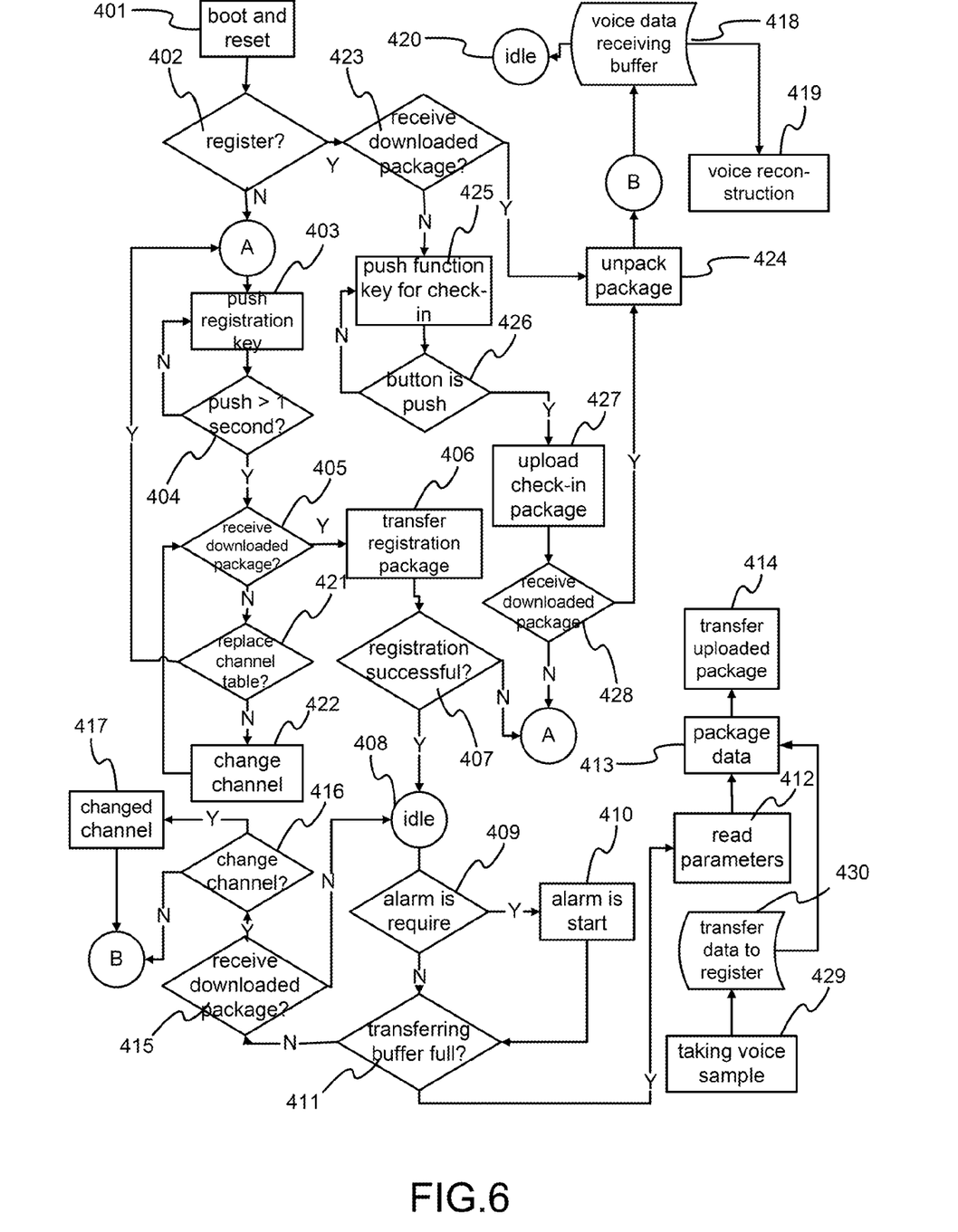
FIG. 6 is the view showing the receiving device.

The receiving device 2 has a method comprising the following steps:

(a) The receiving device is booted and reset 401.

(b) It is checked whether a registration is required 402.

(c) If the registration is not required, the following steps are processed:

(c1) A registration key is pushed 403; and (c2) It is checked whether the registration key is pushed more than one second 404.

(d) If the registration key is not pushed more than one second, the registration key is pushed more than one second again.

(e) If the registration key is pushed more than one second, it is checked whether a downloaded package is received 405.

(f) If the downloaded package is received, the following steps are processed:

(f1) A registration package is transferred 406.

(f2) It is checked whether the registration is successful 407.

(g) If the registration is not successful, go to step (c1).

(h) If the registration is successful, the following steps are processed:

(h1) The receiving device is stayed in an idle status 408.

(h2) It is checked whether an alarm is required 409.

(i) If the alarm is required, the alarm is started 410 and it is checked whether a transferring buffer is full 411.

(j) If the alarm is not required, it is checked whether the transferring buffer is full 411.

(k) If the transferring buffer is full, the following steps are processed:

(k1) Parameters of the receiving device are read 412.

(k2) Data is packaged 413.

(k3) An uploaded package is transferred 414.

(l) If the transferring buffer is not full, it is checked whether a downloaded package is received 415.

(m) If the downloaded package is not received, go to step (h1).

(n) If the downloaded package is received, it is checked whether a frequency channel needs to be changed 416.

(o) If the frequency channel needs to be changed, the following steps are processed:

(o1) The frequency channel is changed to a new frequency channel 417.

(o2) Voice reconstruction is processed 419 through a voice data receiving buffer 418.

(o3) The receiving device is staying in an idle status 420.

(p) If the frequency channel does not need to be changed, step (o2) and step (o3) are processed.

(q) If the downloaded package is not received in step (e), it is checked whether a channel table needs to be replaced 421.

(r) If the channel table does not need to be replaced, frequency channel is changed 422 and then go to step (e).

(s) If the channel table needs to be replaced, go to step (c1).

(t) If a registration is required in step (b), it is checked whether a downloaded package is received 423.

(u) If the downloaded package is received, package is unpacked 424 and step (m2) and step (m3) are processed.

(v) If the downloaded package is not received, the following steps are processed:

(v1) A function key is pushed for check-in 425.

(v2) It is checked whether a button is pushed 426.

(w) If a button is not pushed, a button is pushed again.

(x) If a button is pushed, a check-in package is uploaded 427.

(y) It is checked whether a downloaded package is received 428.

(z) If the downloaded package is received, the package is unpacked 424 and step (o2) and step (o3) are processed.

(aa) If the downloaded package is not received, go to step (c1).

(ab) On voice-sampling, the following steps are processed:

(ab1) A voice sample is taken 429.

(ab2) Data of the voice sample are transferred to a data register 430 and step (i2) and step (i3) are processed.

Figure 1:
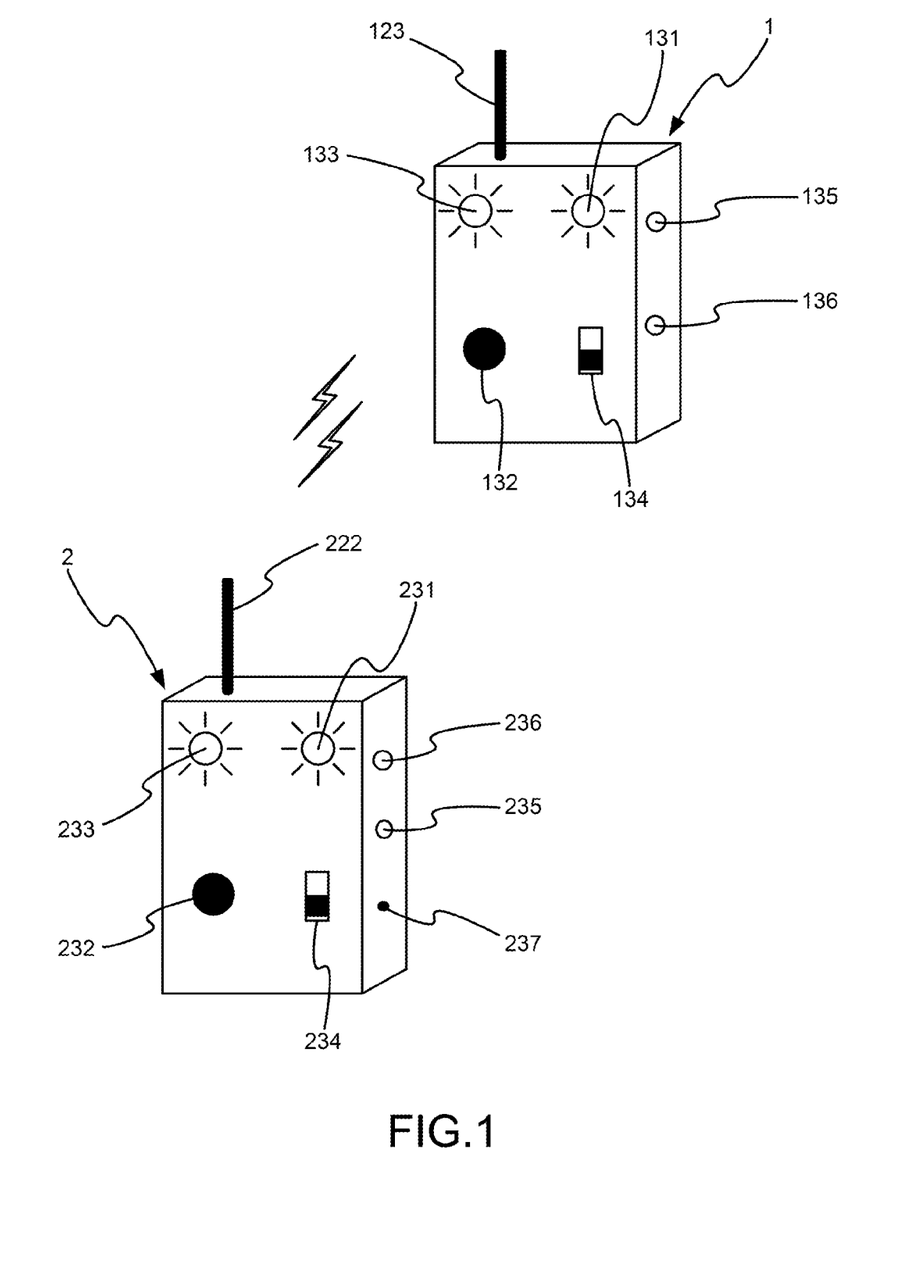
FIG. 1 is the perspective view showing the preferred embodiment according to the present disclosure.
Figure 2:
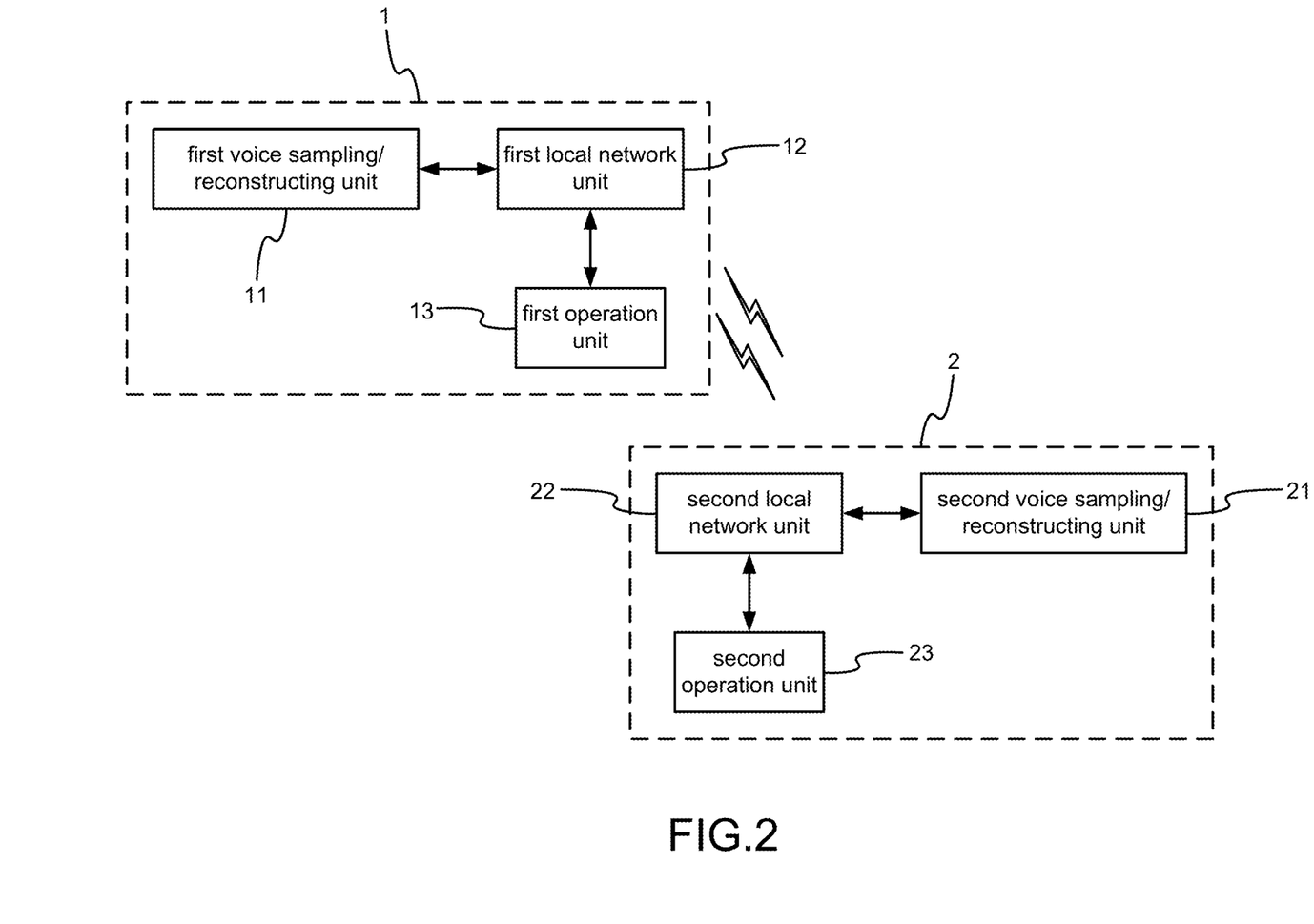
FIG. 2 is the view showing the structure of the present disclosure.
Figure 3:
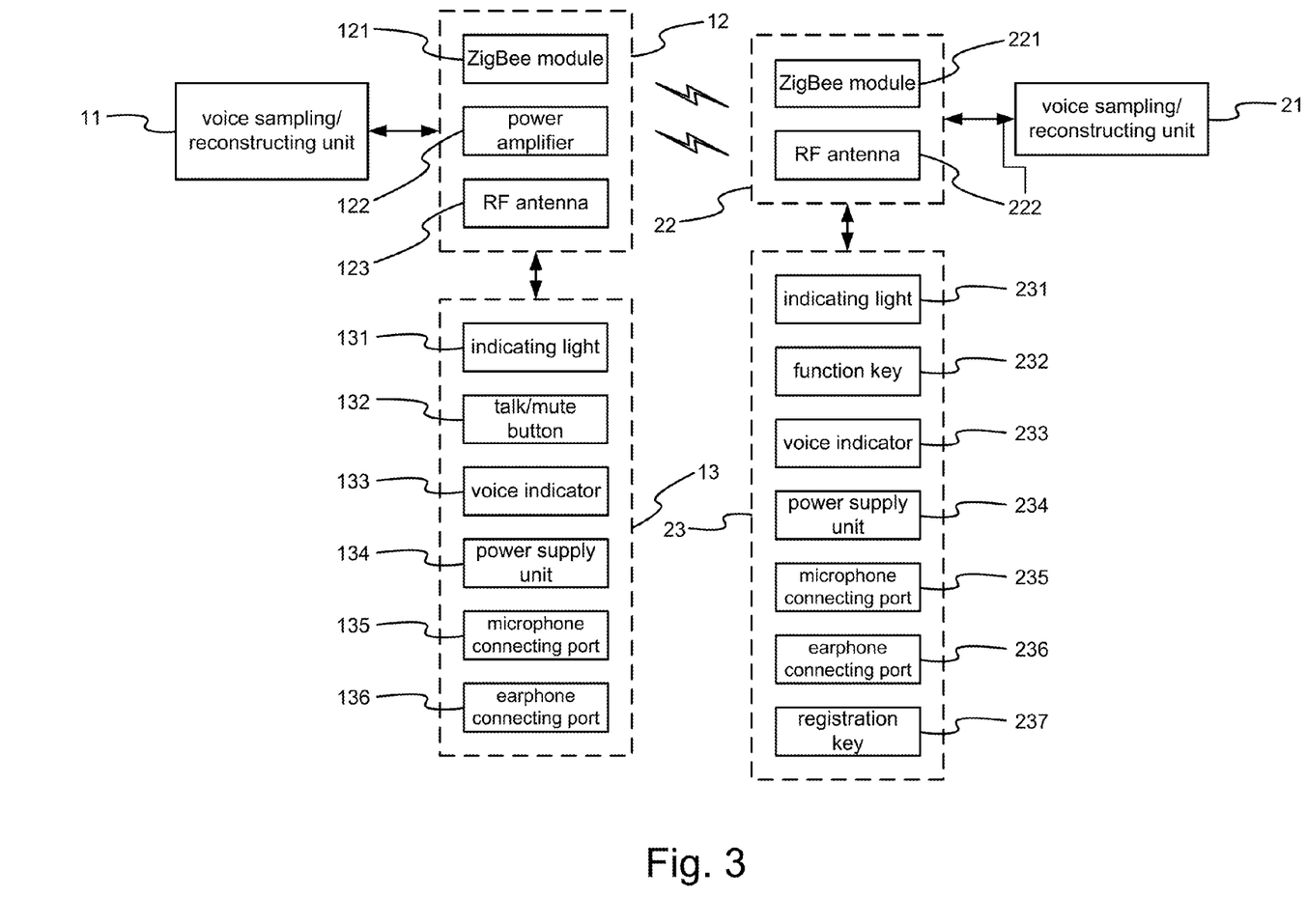
FIG. 3 is the block view showing the present disclosure.
Figure 4:
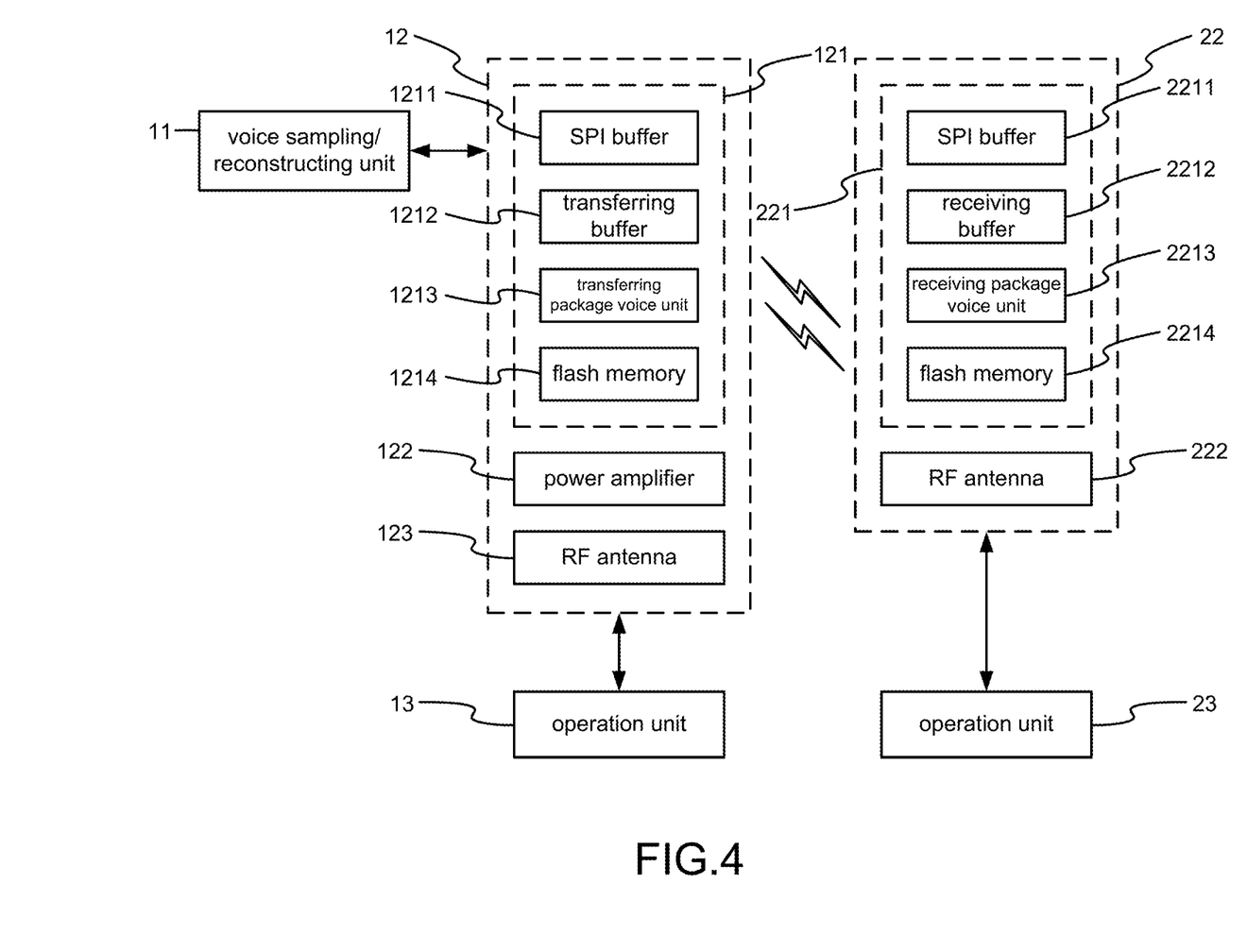
FIG. 4 is the view showing the operation unit.

On using the present disclosure, the emitting device 1 and the receiving device 2 are used for processing mechanisms of registering, checking in, controlling and automatic channel-changing:

(A) The receiving device 2 has to be registered at the emitting device 1 to receive data from the emitting device 1. The registration process is as follows:

1. The registration key 237 of the receiving device 2 is pushed more than one second.

2. The first indicating light 131 of the emitting device 1 flashes.

3. The second indicating light 231 of the receiving device 2 flashes.

4. The function key 232 of the receiving device 2 is pushed for confirmation.

5. After the registration is successful, the first and second indicating lights 131,231 of the emitting device 1 and the receiving device 2 are turned off.

If the above steps are not finished in five seconds, the emitting device 1 and the receiving device 2 will return to the original status with the first and second indicating lights 131, 231 of the emitting device 1 and the receiving device 2 turned off. Once the registration is finished, no more registration is required except for another device.

(B) The receiving device 2 has to check-in after booting for receiving data. The check-in process is as follows:

1. After being booted, the emitting device 1 calls out each of the registered receiving devices 2 individually. After every booted receiving device 2 replies, the check-in process is finished automatically. Then, each connection between the emitting device 1 and the receiving device 2 is broken and the second indicating light 231 is turned off.

2. If the receiving device 2 is booted after the emitting device 1 calls out the receiving devices 2 in step (1), the second indicating light 231 is turned on for showing no connection. At the moment, the function key 232 has to be pushed to finish the check-in process so that the second indicating light 231 will be turned off.

(C) For controlling, the following process is done: Every emitting device 1 may have 255 receiving devices 2 at most. For saving repeated registrations, the receiving devices 2 use their original numbers obtained from the previous registrations. After the numbers (say 255 numbers) are all used, if a new registration application is received, a number selected from a list of numbers for the unchecked-in receiving devices 2 is used. If all receiving devices 2 are checked-in, a temporary number will be used for all new registration applications. If a receiving device 2 using the temporary number is rebooted, the receiving device 2 has to register again to get a number. If a registered receiving device 2 finds its number is used by other receiving device 2 on checking-in, the second indicating light 231 is turned on for showing an unregistered status and the registration has to be done again.

(D) Concerning channel-changing (shown in FIG. 7), the emitting device 1 demands the checked-in receiving devices 2 to report receiving qualities one by one. If all of the receiving qualities are not good, the emitting device 1 sends a channel-changing notice and then the frequency channel is changed to a next one on a channel table. After the frequency channel is changed, wait for 110 milliseconds (ms). If the receiving device 2 receives the channel-changing notice, the receiving device 2 changes its frequency channel accordingly. When the receiving device 2 does not receive the channel-changing notice continuously for 2 times, the frequency channel of the receiving device 2 is started to be changed between the original frequency channel and the next frequency channel; and, after 110 ms, every frequency channel is started to be scanned continuously at a speed of 6.4 ms per frequency channel until receiving the channel-changing notice from the emitting device 1. Since time required for scanning 16 channels is 102.4 ms, time to wait after changing the frequency channel has to be at least 110 ms. The emitting device 1 has a randomly chosen channel table when it is used at the first time. Hence, in theory, there are 16! (=1×2×3×4 . . . ×16) kinds of tables; and chance for two same tables obtained by the emitting device 1 is $(1/16!)=4.8\times10^{-14}$. After the channel table of the emitting device 1 is obtained, the channel table is automatically saved in the first flash memory 1214 and will never be changed except by outer force. Whenever a receiving device 2 applies a registration request to the emitting device 1, the emitting device 1 sends the channel table to the receiving device 2 in the reply to the request. Therefore, when any interference happens, frequency channel can be rapidly changed. Besides, the channel table obtained on registration for the receiving device 2 will only change on processing the registration again.

Regarding the time sequence (shown in FIG. 7), the emitting device 1 sends a package every 5 ms. The package contains 57 bytes with a transferring time (57 bytes)×(8 bits/sec)/250 kbps=1824 us. Hence, after the receiving device 2 receives the package, a good deal of time as 3.176 ms is left for handling the package.

Figure 7:
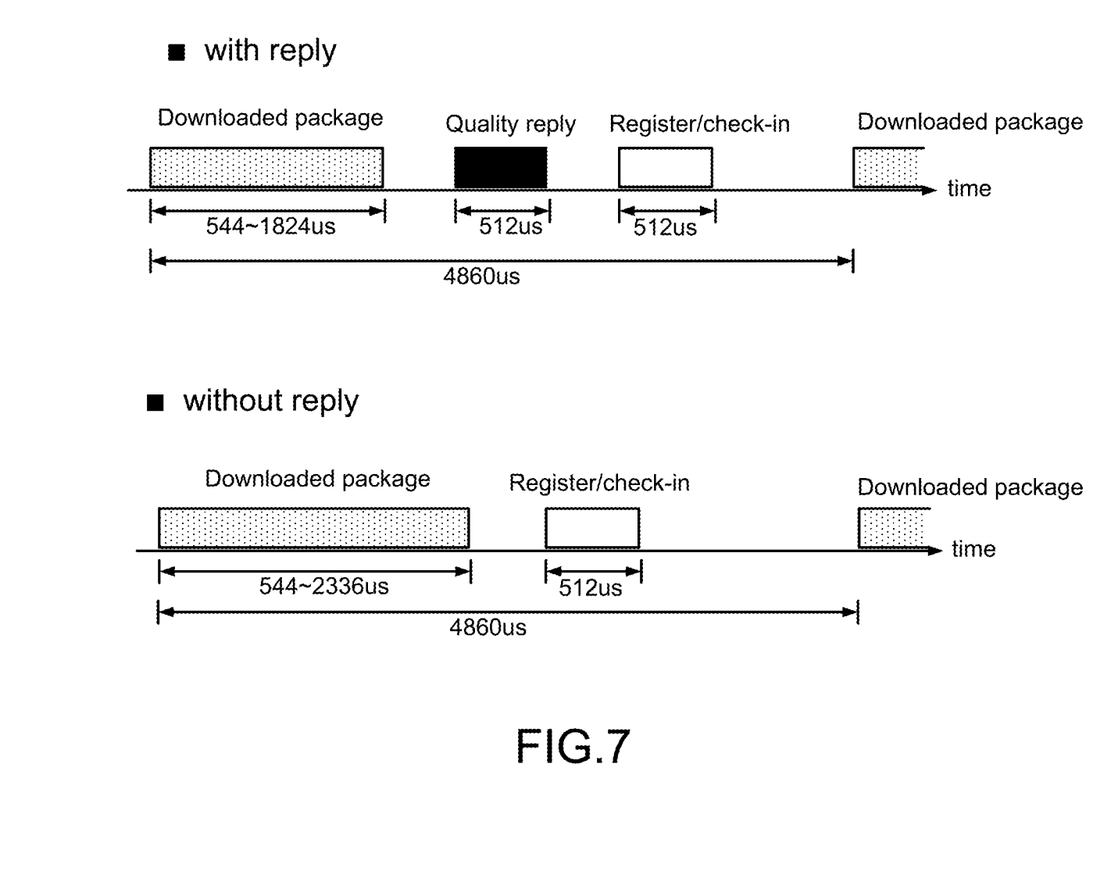
FIG. 7 is the view showing the time sequence.

Averagely, the emitting device 1 spends 4860 microseconds (μs) for a package. The package can be a 17 bytes downloaded message or a 57 bytes downloaded voice; or, a 33 or 73 bytes package for replying a registration request. After the receiving device 2 which is demanded by the emitting device 1 to reply transferring quality receives the downloaded package from the emitting device 1, the receiving device 2 immediately sends the transferring quality package.

The receiving device 2 only sends the registration or check-in package at the end of a cycle. Because the registration package is longer, the time left is not so leisure for sending the registration (or check-in) package if the time occupied by the transferring-quality package is counted in. Therefore, the registration package does not contain the transferring-quality package. If the downloaded package is a reply package from the emitting device 1 to a registration request, the receiving device 2 for registration or check-in can send packages right after the reply package; or else, the receiving device 2 has to wait about 960 μs for sending packages after receiving the reply package.

The packages transferred between the emitting device t and the receiving devices 2 are downloaded packages and uploaded packages.

A downloaded package has the following format:

| 6 | 2 | 1 | 2 | 2 | 1 | 1 | 0/16 | 0/40 | 2 |
|---|---|---|---|---|---|---|---|---|---|
| PHY Header | FCF | DSN | PANID | Address | Command | RegNo | Channel Seq. | Voice Data | FCS |

Therein:
FCF=0x80;
DSN: sequence number of the package;
PAN ID: network number;
Address: number of the assigned device;
RegNo: registration number for replying or assigning;
Channel Seq.: channel table; and
Command: command for the downloaded package, having the following format:

| 1 | Voice | Register | Change channel | (reserve) | (reserve) | (reserve) | (reserve) |
|---|---|---|---|---|---|---|---|

An uploaded package has the following format:

| 6 | 2 | 1 | 2 | 2 | 1 | 2 |
|---|---|---|---|---|---|---|
| PHY Header | FCF | RegNo | PANID | Address | Command | FCS |

Therein:
FCF=0x81;
RegNo: registration number;
Address: sequence number of the device; and
Command: command for the downloaded package, having the following format:

| 0 | Transferring quality | Registration request | Registration confirmation | Check in | (reserve) | (reserve) | (reserve) |
|---|---|---|---|---|---|---|---|

Figure 8:
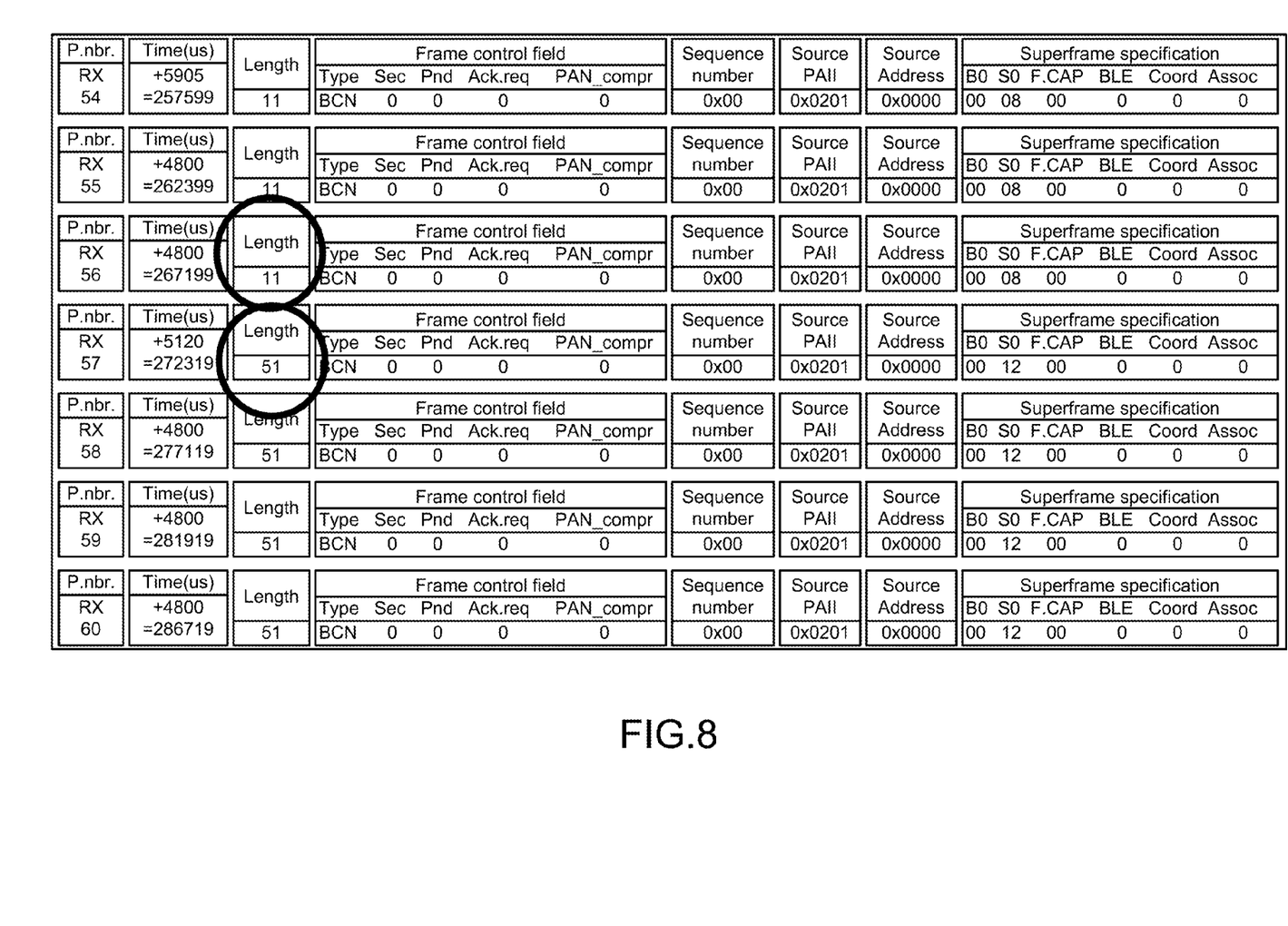
FIG. 8 is the view showing the voice package.

According to the data package format regulated in IEEE 802.15.4, a voice package includes 6 bytes PHY header, 2 bytes FCF, 1 byte DSN, 2 bytes Destination PANID, 2 bytes Destination Address, n bytes voice data, 2 bytes error check code and 2 bytes reserved system command. Therein, because the source of the package is PAN Coordinator, Source PANID and Source Address are omitted. If the package is a broadcasting package, Destination Address will be filled in with 0xFFFF.

In FIG. 8, the packages before and after pushing the talk/mute button 132 of the emitting device 1 are shown. The MSDU package (excluding the 6 bytes PHY header) is increased from 11 bytes to 51 bytes for an amount of 40 bytes.

Figure 9:
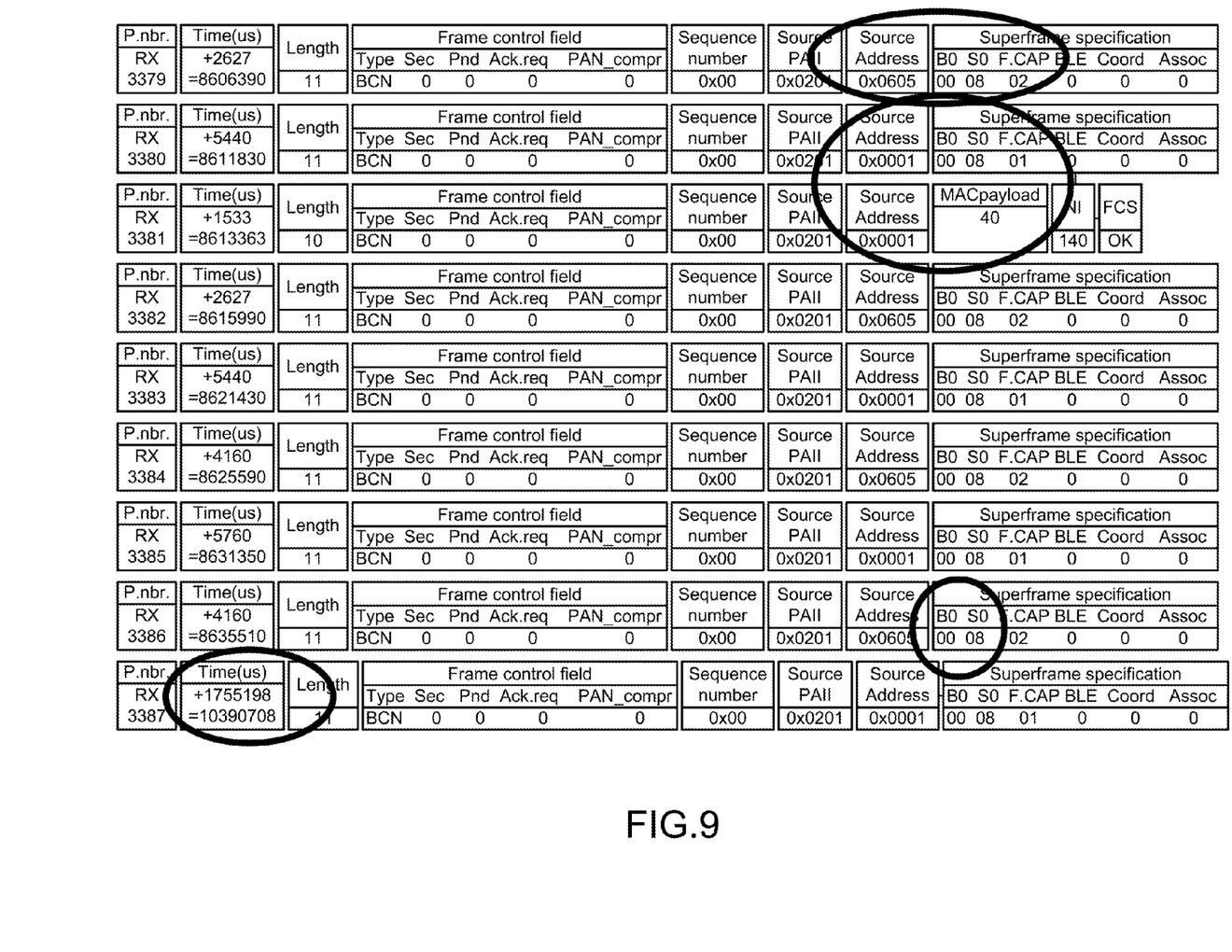
FIG. 9 is the view showing the channel-changing.

In FIG. 9, a channel-changing mechanism is shown. Sniffer monitors a frequency channel each time only. Hence, status for channel-changing is recorded. Two receiving devices 2 at 0x0605 and 0x0001 are on-line. The receiving device 2 at 0x0605 is shut down and then the receiving device 2 at 0x000 is shut down. As shown in the figure, after shutting shown 0x0605, 0x0605 does not sends receiving quality any more. Because 0x0001 still sends receiving quality 0x6C, system does not change frequency channel and Sniffer still sees package. However, when 0x0001 is shut down too, the emitting device 1 no more receives any reply and, later on, the emitting device 1 sends an channel-changing notice (Command=0x90). Thus, the frequency channel is changed and Sniffer no more sees package until 1755.198 ms later. Because the emitting device 1 keeps changing the frequency channel with an interval about 110 ms between two frequency channels, the total time of intervals for 15 frequency channels is 1650 ms. In addition, after receiving the channel-changing notice, about 5 ms of time is spent for waiting. The total time is summed up to about 1725 ms, which is quite close to 1755.198 ms.

Figure 10:
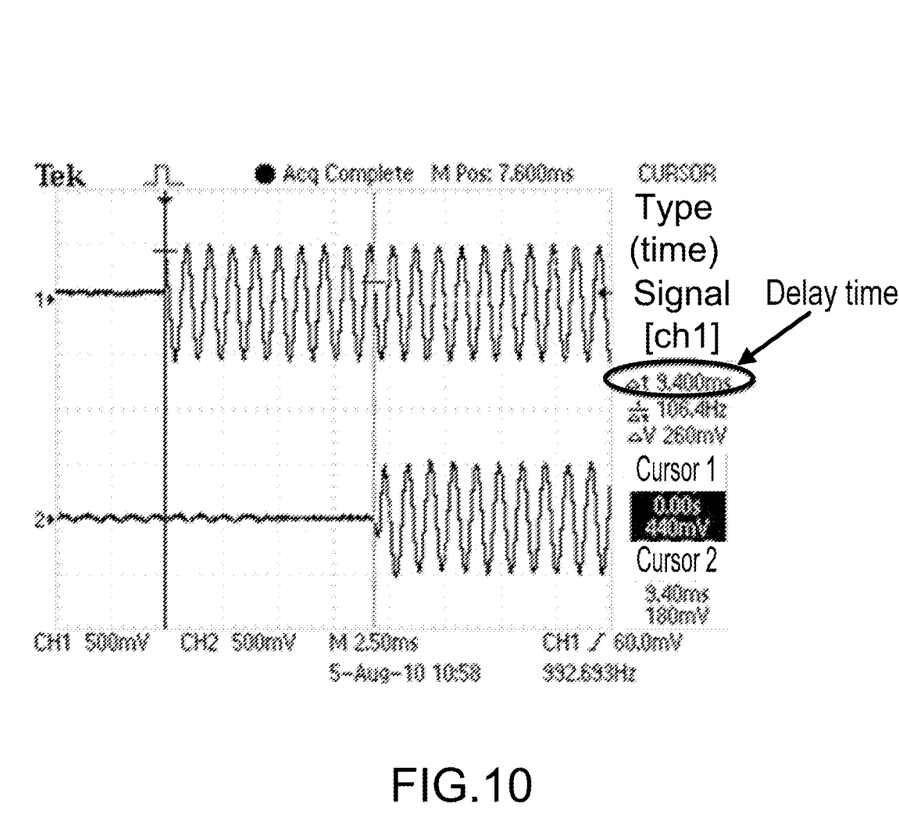
FIG. 10 is the view showing the transferring of the voice signals.

In FIG. 10, a wave of 1 kHz and 0.5 V is used. Therein, good voice transference is shown with a delay time below 10 ms, which is under control as expected.

The present disclosure is a full-duplex wireless voice broadcasting apparatus with channel-changing and interference-resistance. The apparatus can change frequency channel automatically and is interference-resistant to noise occurred on voice broadcasting. The full-duplex voice communication function of the present disclosure makes the emitting device 1 capable of one-way amplifying or broadcasting and makes the receiving device 2 become pager for emergency. Hence, the present disclosure can become a calling system, a teaching system, a touring guide system, an emergency system, etc. to be used in domestic life, in school or even in army.

To sum up, the present disclosure is a full-duplex wireless voice broadcasting apparatus with channel-changing and interference-resistance, where full-duplex (two-way) voice communication is achieved; the present disclosure has at least one receiving device with good mobility to be used as an emergent caller to an emitting device of the present disclosure; and the present disclosure has advantages in interference resistance, energy saving, short-distance emergent calling, and calling for help.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A full-duplex wireless voice broadcasting apparatus with channel-changing and interference-resistance, comprising:
    an emitting device 1, said emitting device 1 comprising:
        a first voice sampling/reconstructing unit 11;
        a first local network unit 12, said first local network unit 12 being connected with said first voice sampling/reconstructing unit 11; and
        a first operation unit 13, said first operation unit 13 being connected with said first local network unit 12,
    wherein said emitting device 1 periodically emits data packages and said data packages contain data selected from a group consisting of voice data and non-voice data; and
    at least one receiving device 2, said receiving device 2 comprising:
        a second voice sampling/reconstructing unit 21;
        a second local network unit 22, said second local network unit 22 being connected with said second voice sampling/reconstructing unit 21; and
        a second operation unit 23, said second operation unit 23 being connected with said second local network unit 22,
    wherein, after being connected with said emitting device 1, said receiving device 2 receives said data packages; and a standby status is maintained between said emitting device 1 and said receiving device 2,
    wherein said first local network unit 12 comprises:
        a first ZigBee module 121;
        a power amplifier 122, said power amplifier 122 being connected with said first ZigBee module 121; and
        a first radio frequency (RF) antenna 123, said first RF antenna 123 being connected with said power amplifier 122,
    wherein said first ZigBee module 121 comprises:
        a first SPI buffer 1211;
        a transferring buffer 1212;
        a transferring package voice unit 1213; and
        a first flash memory 1214.

2. The device according to claim 1,
    wherein said first voice sampling/reconstructing unit 11 and said first local network unit 12 are mutually connected through a serial peripheral interface (SPI).

3. The device according to claim 1, wherein said first operation unit 13 comprises:
    a first indicating light 131;
    a talk/mute button 132;
    a first and second voice indicator 133;
    a first power supply unit 134;
    a first microphone connecting port 135; and
    a first earphone connecting port 136.

4. The device according to claim 1,
    wherein said second voice sampling/reconstructing unit 21 and said second local network unit 22 are mutually connected through an SPI.

5. The device according to claim 1, wherein said second local network unit 22 comprises:
    a second ZigBee module 221; and
    a second RF antenna 222, said second RF antenna 222 being connected with said ZigBee module 221.

6. The device according to claim 5,
    wherein said second ZigBee module 221 comprises:
        a second SPI buffer 2211;
        a receiving buffer 2212;
        a receiving package voice unit 2213; and
        a second flash memory 2214.

7. The device according to claim 1, wherein said second operation unit 23 comprises:
    a second indicating light 231;
    a function key 232;
    a second voice indicator 233;
    a second power supply unit 234;
    a second microphone connecting port 235;
    a second earphone connecting port 236; and
    a registration key 237.

8. The device according to claim 1, wherein said emitting device 1 processing the stop of:
    (a) booting and resetting said emitting device 301;
    (b) staying in an idle status 302;
    (c) checking whether an uploaded package is received 303;
    (d) if said uploaded package is not received, processing steps of:
        (d1) reading data in said first flash memory 304;
        (d2) setting a quality feedback code 305;
        (d3) packaging data 306; and
        (d4) transferring a downloaded package 307 and then going to step (b);
    (e) if said uploaded package is received, unpacking said uploaded package 308;

(f) through a voice data receiving buffer 309, processing voice reconstruction 310;
(g) checking whether a connection exists 311;
(h) if said connection exists, checking whether an alarm parameter exists 312;
(i) if said connection does not exist, setting a wireless channel parameter 313 and then checking whether said alarm parameter exists 312;
(j) if said alarm parameter exists, starting a light and a voice alarm 314 and checking whether a registration parameter and a check-in parameter exist 315;
(k) if said alarm parameter does not exist, directly checking whether said registration parameter and said check-in parameter exist 315;
(l) if said registration parameter and said check-in parameter do not exist, reading parameters of said emitting device 316 and then going to step (d1);
(m) if said registration parameter and said check-in parameter exist, setting said registration parameter 317;
(n) writing buffer data into said first flash memory 318;
(o) reading parameters of said emitting device 316 and then going to step (d1); and
(p) on voice-sampling, processing steps of:
  (p1) directly taking a voice sample 319;
  (p2) transferring said voice sample to a data register 320;
  (p3) checking whether a transferring buffer is full 321;
  (p4) if said transferring buffer is full, reading said parameters of said emitting device 316 and then going to step (d1); and
  (p5) if said transferring buffer is not full, going to step (p1).

9. The device according to claim 1, wherein said receiving device 2 processing the step of:
(a) booting and resetting said receiving device 401;
(b) checking whether a registration is required 402;
(c) if said registration is not required, processing steps of:
  (c1) pushing a registration key 403; and
  (c2) checking whether said registration key is pushed more than one second 404;
(d) if said registration key is not pushed more than one second, pushing said registration key more than one second again;
(e) if said registration key is pushed more than one second, checking whether a downloaded package is received 405;
(f) if said downloaded package is received, processing steps of:
  (f1) transferring a registration package 406; and
  (f2) checking whether said registration is successful 407;
(g) if said registration is not successful, going to step (c1);
(h) if said registration is successful, processing steps of:
  (h1) staying in an idle status 408; and
  (h2) checking whether an alarm is required 409;
(i) if said alarm is required, starting said alarm 410 and checking whether a transferring buffer is full 411;
(j) if said alarm is not required, directly checking whether said transferring buffer is full 411;
(k) if said transferring buffer is full, processing steps of:
  (k1) reading parameters of said receiving device 412;
  (k2) packaging data 413; and
  (k3) transferring an uploaded package 414;
(l) if said transferring buffer is not full, checking whether a downloaded package is received 415;
(m) if said downloaded package is not received, going to step (h1);
(n) if said downloaded package is received, checking whether a frequency channel needs to be changed 416;
(o) if said frequency channel needs to be changed, processing steps of:
  (o1) changing said frequency channel to a new frequency channel 417;
  (o2) processing voice reconstruction 419 through a voice data receiving buffer 418; and
  (o3) staying in an idle status 420;
(p) if said frequency channel does not need to be changed, processing step (o2) and step (o3);
(q) if said downloaded package is not received in step (e), checking whether a channel table needs to be replaced 421;
(r) if said channel table does not need to be replaced, changing frequency channel 422 and then going to step (e);
(s) if said channel table needs to be replaced, going to step (c1);
(t) if a registration is required in step (b), checking whether a downloaded package is received 423;
(u) if said downloaded package is received, unpacking package 424 and processing step (m2) and step (m3);
(v) if said downloaded package is not received, processing steps of:
  (v1) pushing a function key for check-in 425; and
  (v2) checking whether a button is pushed 426;
(w) if a button is not pushed, pushing a button again;
(x) if a button is pushed, uploading a check-in package 427;
(y) checking whether a downloaded package is received 428;
(z) if said downloaded package is received, unpacking package 424 and processing step (o2) and step (o3);
(aa) if said downloaded package is not received, going to step (c1); and
(ab) on voice-sampling, processing steps of:
  (ab1) taking voice sample 429; and
  (ab2) transferring data of said voice sample to a data register 430 and processing step (i2) and step (i3).

10. A full-duplex wireless voice broadcasting apparatus with channel-changing and interference-resistance, comprising:
an emitting device 1, said emitting device 1 comprising:
  a first voice sampling/reconstructing unit 11;
  a first local network unit 12, said first local network unit 12 being connected with said first voice sampling/reconstructing unit 11; and
  a first operation unit 13, said first operation unit 13 being connected with said first local network unit 12,
wherein said emitting device 1 periodically emits data packages and said data packages contain data selected from a group consisting of voice data and non-voice data; and
at least one receiving device 2, said receiving device 2 comprising:
  a second voice sampling/reconstructing unit 21;
  a second local network unit 22, said second local network unit 22 being connected with said second voice sampling/reconstructing unit 21; and
  a second operation unit 23, said second operation unit 23 being connected with said second local network unit 22,
wherein, after being connected with said emitting device 1, said receiving device 2 receives said data packages; and a standby status is maintained between said emitting device 1 and said receiving device 2, wherein said second local network unit 22 comprises:
    a second ZigBee module 221; and
    a second RF antenna 222, said second RF antenna 222 being connected with said ZigBee module 221
wherein said second ZigBee module 221 comprises:
    a second SPI buffer 2211;
    a receiving buffer 2212;
    a receiving package voice unit 2213; and
    a second flash memory 2214.

11. A full-duplex wireless voice broadcasting apparatus with channel-changing and interference-resistance, comprising:
    an emitting device 1, said emitting device 1 comprising:
        a first voice sampling/reconstructing unit 11;
        a first local network unit 12, said first local network unit 12 being connected with said first voice sampling/reconstructing unit 11; and
        a first operation unit 13, said first operation unit 13 being connected with said first local network unit 12,
    wherein said emitting device 1 periodically emits data packages and said data packages contain data selected from a group consisting of voice data and non-voice data; and
    at least one receiving device 2, said receiving device 2 comprising:
        a second voice sampling/reconstructing unit 21;
        a second local network unit 22, said second local network unit 22 being connected with said second voice sampling/reconstructing unit 21; and
        a second operation unit 23, said second operation unit 23 being connected with said second local network unit 22,
    wherein, after being connected with said emitting device 1, said receiving device 2 receives said data packages; and a standby status is maintained between said emitting device 1 and said receiving device 2,
    wherein said emitting device 1 is configured to perform the following steps:
    (a) booting and resetting said emitting device 301;
    (b) staying in an idle status 302;
    (c) checking whether an uploaded package is received 303;
    (d) if said uploaded package is not received, processing steps of:
        (d1) reading data in said first flash memory 304;
        (d2) setting a quality feedback code 305;
        (d3) packaging data 306; and
        (d4) transferring a downloaded package 307 and then going to step (b);
    (e) if said uploaded package is received, unpacking said uploaded package 308;
    (f) through a voice data receiving buffer 309, processing voice reconstruction 310;
    (g) checking whether a connection exists 311;
    (h) if said connection exists, checking whether an alarm parameter exists 312;
    (i) if said connection does not exist, setting a wireless channel parameter 313 and then checking whether said alarm parameter exists 312;
    (j) if said alarm parameter exists, starting a light and a voice alarm 314 and checking whether a registration parameter and a check-in parameter exist 315;
    (k) if said alarm parameter does not exist, directly checking whether said registration parameter and said check-in parameter exist 315;
    (l) if said registration parameter and said check-in parameter do not exist, reading parameters of said emitting device 316 and then going to step (d1);
    (m) if said registration parameter and said check-in parameter exist, setting said registration parameter 317;
    (n) writing buffer data into said first flash memory 318;
    (o) reading parameters of said emitting device 316 and then going to step (d1); and
    (p) on voice-sampling, processing steps of:
        (p1) directly taking a voice sample 319;
        (p2) transferring said voice sample to a data register 320;
        (p3) checking whether a transferring buffer is full 321;
        (p4) if said transferring buffer is full, reading said parameters of said emitting device 316 and then going to step (d1); and
        (p5) if said transferring buffer is not full, going to step (p1).

\* \* \* \* \*